US007486590B2

(12) United States Patent
Knittel

(10) Patent No.: US 7,486,590 B2
(45) Date of Patent: Feb. 3, 2009

(54) ULTRASONIC SENSOR COMPRISING AN ADJUSTABLE DETECTION AREA

(75) Inventor: Thomas Knittel, Waldsee (DE)

(73) Assignee: Pepperl + Fuchs GmbH, Mannheim (DE)

( * ) Notice: Subject to any disclaimer, the term of this patent is extended or adjusted under 35 U.S.C. 154(b) by 0 days.

(21) Appl. No.: 11/659,390

(22) PCT Filed: Aug. 3, 2005

(86) PCT No.: PCT/EP2005/008422

§ 371 (c)(1),
(2), (4) Date: Feb. 5, 2007

(87) PCT Pub. No.: WO2006/015788

PCT Pub. Date: Feb. 16, 2006

(65) Prior Publication Data

US 2008/0089178 A1    Apr. 17, 2008

(30) Foreign Application Priority Data

Aug. 4, 2004 (DE) .................. 10 2004 037 723

(51) Int. Cl.
*G01S 7/527* (2006.01)
(52) U.S. Cl. .................. 367/98; 367/902
(58) Field of Classification Search ............ 367/98, 367/900, 905
See application file for complete search history.

(56) References Cited

U.S. PATENT DOCUMENTS

| 4,315,325 A | * | 2/1982 | Blades | 367/98 |
| 4,975,889 A | * | 12/1990 | Petrucelli et al. | 367/98 |
| 4,992,998 A | | 2/1991 | Woodward et al. | |
| 5,077,701 A | | 12/1991 | Lill | |
| 5,150,334 A | * | 9/1992 | Crosby | 367/98 |
| 5,212,671 A | | 5/1993 | Fujii et al. | |
| 5,319,611 A | | 6/1994 | Korba et al. | |
| 5,319,972 A | | 6/1994 | Oblak et al. | |
| 6,304,179 B1 | | 10/2001 | Lotito et al. | |
| 7,327,635 B2 | * | 2/2008 | Knittel | 367/98 |
| 2004/0102919 A1 | | 5/2004 | Eckel et al. | |
| 2005/0041528 A1 | | 2/2005 | Knittel | |
| 2008/0089178 A1 | * | 4/2008 | Knittel | 367/98 |

FOREIGN PATENT DOCUMENTS

| DE | 36 07 335 A1 | 9/1987 |
| DE | 39 37 585 A1 | 5/1991 |
| DE | 44 23 639 C2 | 3/1996 |
| WO | WO 02/48737 A1 | 6/2002 |
| WO | WO 2006015788 A2 * | 2/2006 |

OTHER PUBLICATIONS

International Search Report.

* cited by examiner

*Primary Examiner*—Dan Pihulic
(74) *Attorney, Agent, or Firm*—Collard & Roe, P.C.

(57) ABSTRACT

The invention relates to an ultrasonic sensor with an adjustable detection range for use in gaseous media, preferably air. A threshold value generator generates threshold value curves that are fed to a comparator. The change in the detection range of the ultrasonic sensor, namely, the change in its switching point curve, is carried out by influencing the threshold value curves, whereby, in a selectable manner, the detection range can be adjusted either exclusively in the lateral extension of the sonic cone or else in the axial and lateral extensions of the sonic cone.

11 Claims, 5 Drawing Sheets

Figure 1:
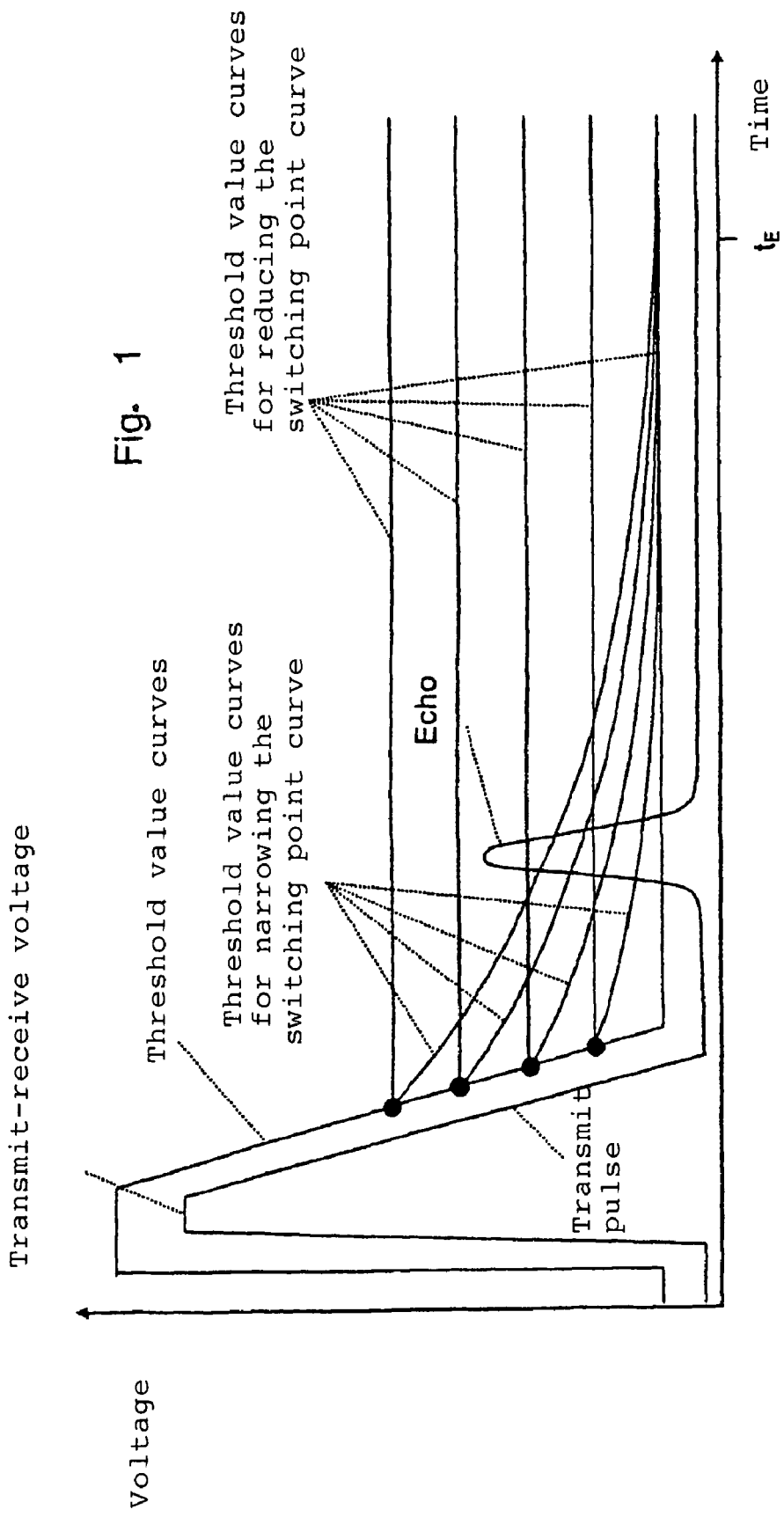

Switching point curves in the case of reduction of the switching point curve

Switching point curves in the case of narrowing of the switching point curve

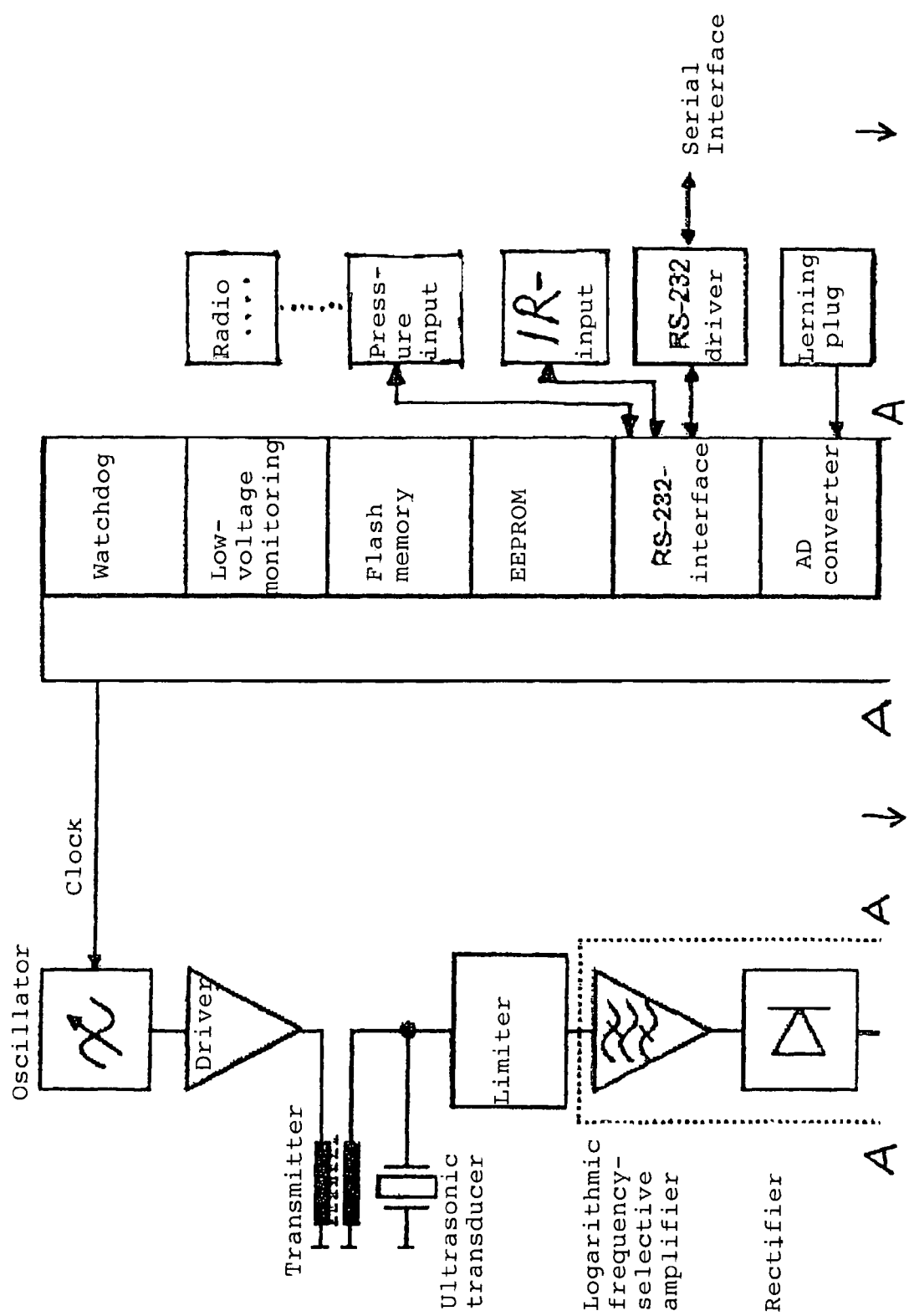
Fig. 4/1

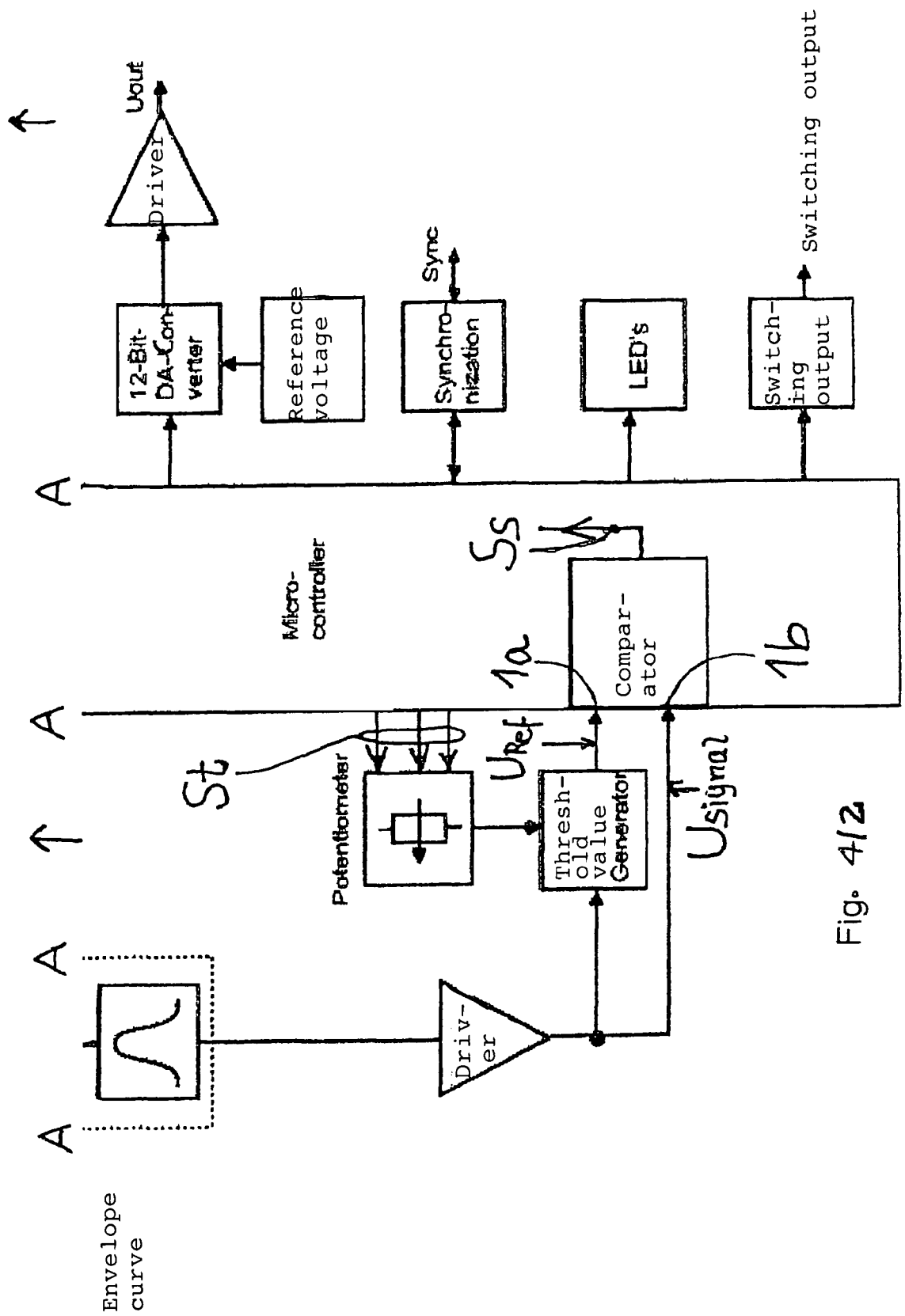
Fig. 4/2

ULTRASONIC SENSOR COMPRISING AN ADJUSTABLE DETECTION AREA

CROSS REFERENCE TO RELATED APPLICATIONS

Applicant claims priority under 35 U.S.C. §119 of German Application No. 10 2004 037 723.5 filed Aug. 4, 2004. Applicant also claims priority under 35 U.S.C. §365 of PCT/EP2005/008422 filed Aug. 3, 2005. The international application under PCT article 21(2) was not published in English.

FIELD OF THE INVENTION

The invention relates to an ultrasonic sensor with an adjustable detection range, namely, with an adjustable switching point curve, with an ultrasonic transducer for emitting and/or receiving ultrasonic waves in gaseous media, preferably air, whereby the sonic cone of the ultrasonic waves extends axially in the direction of the main axis of the main emitting direction and laterally in the direction perpendicular to said main axis, with a threshold value generator for generating at least one threshold value curve and with at least one comparator that has a first threshold value input to which the threshold voltage of the threshold value generator is applied as well as at least one signal input to which the transmit-receive signal of the ultrasonic transducer is applied, and when a transmit-receive signal that is greater than the threshold voltage is present at the comparator, the comparator emits a switching signal according to the generic part of claim 1.

DESCRIPTION OF RELATED ART

Such ultrasonic sensors are frequently used in the industrial realm for detecting a wide array of objects in all kinds of environments. Therefore, depending on the application, different requirements are made of the detection range of the ultrasonic sensors. The term detection range of an ultrasonic sensor refers to a spatial volume within which the ultrasonic sensor can clearly detect an object. This volume is often rotation-symmetrical and has a certain extension, namely, in the axial direction, that is to say, in the direction of the main axis of the main emitting direction and in the lateral direction, that is to say, in the direction perpendicular to said main axis.

The detection range is determined by various factors which are listed below, without any claim being made as to their completeness:
spatial sound field distribution of the ultrasonic transducer.
The crucial aspect here is the sound field distribution in transmission with information feedback (echo principle), that is to say, the superimposition of the transmit characteristics and the receive characteristics. The spatial sound field distribution depends on the transmit frequency, on the diameter of the ultrasonic transducer and on the amplitude distribution on its active surface.
magnitude of the transmit voltage
duration of the transmit pulse
time-dependent amplification of the receive amplifier
time-dependent value of the evaluation threshold
reflection factor of the object.

In an application for which an object is to be detected within the largest possible solid angle, one needs, for example, an ultrasonic sensor with a detection range with the greatest possible lateral extension. For an application in which, for example, an object is to be recognized through a hole in a metal sheet, an ultrasonic sensor is needed with a detection range with the smallest possible lateral extension.

For applications in which interfering echoes are to be masked out of the background, it is practical to adapt the axial extension of the detection range to the application.

One option would be to use different ultrasonic sensors, each with a correspondingly adapted detection range. However, the need to use different ultrasonic sensors is disadvantageous and inflexible.

German patent specification DE 44 23 639 C2 proposes another possibility, namely, an ultrasonic transducer for emitting and/or receiving ultrasonic waves in gaseous media, consisting of a disk-shaped piezoelectrically excitable ceramic that is polarized in the thickness direction, that has an electrode surface on both of the main surfaces, and that has a cylindrical $\lambda/4$ matching element on one of the main surfaces whose normal faces in the main emitting direction, for purposes of acoustic impedance matching between the piezoceramic and the surrounding gaseous medium. In order to achieve a selectable emitting characteristic, the matching element consists of a cylindrical inner part and a ring-shaped, lower outer part, whereby the transducer can be excited in such a way that either the cylinder or the ring resonates, the height of the inner cylinder amounts to one-fourth of the wavelength of the matching element and is harmonized with the fundamental wave of the ceramic, the thickness of the ring likewise amounts to one-fourth of the wavelength of the matching element and is harmonized with the first radial harmonic component of the ceramic, whereby the ring thickness—due to the higher frequency of the first radial harmonic component of the ceramic—is correspondingly smaller than that of the cylinder. The electrode surfaces of the ceramic disk are divided into a disk-shaped inner part and a ring-shaped outer part, whereby the radius of the separation line coincides with the nodal line of the first radial harmonic component of the ceramic, and, on the electrode surface facing the matching element, for purposes of contacting the side of the ceramic disk facing the matching element, the ring surface is provided with a web-shaped recess through which the electric potential of the disk-shaped inner electrode is applied to the outside of the ceramic disk. This ultrasonic transducer, however, has the drawback that it has two cones that are not adjustable but rather that are fixed with predefined dimensions; consequently, this ultrasonic transducer cannot be adjusted with a sufficient level of sensitivity.

Moreover, U.S. Pat. No. 5,212,671 discloses an ultrasonic transducer for emitting and/or receiving ultrasonic waves for acoustic coupling into fluids such as human tissue, consisting of a backing material layer, a reflection layer, a piezoceramic layer with electrodes applied onto both sides and a matching layer that is a homogeneous disk having the diameter of the ceramic disk. On its reverse side, there is a reflection layer on which a thicker backing material layer is present which has a centered, cylindrical elevation with which the material layer engages into a ring-shaped hole of the ring-shaped reflector. The center and its vicinity to the piezoceramic oscillate at $\lambda/2$ resonance, while the ring-shaped surrounding layer oscillates at $\lambda/4$ resonance, as a result of which the transducer is fundamentally capable of oscillating at two resonance frequencies. In both cases, the ceramic executes thickness oscillations. Therefore, the inner part of the ceramic disk resonates at twice the frequency of the outer part at a ratio of 1:2. This ultrasonic transducer is likewise not adjustable during operation.

Moreover, international patent WO 02/48737 discloses an adaptive comparator circuit for an acoustic range-finding sensor, with a first comparator that has a first threshold value input to which a first threshold voltage is applied and a first signal input to which a voltage signal is applied and that emits a first switching signal when a voltage signal is present that is greater than the first threshold voltage. The comparator circuit has a microcontroller as the signal transmitter that at times emits a control signal, and it also has a first switch having a control means, a switch input and a switch output and, through the action of the control signal on the control means, said first switch can be controlled or activated in such a way that it is in the closed state when the signal transmitter emits a control signal and otherwise, it is in the open state or vice versa. The switch input is connected to the positive first pole of a first source of direct voltage, and the switch output is connected to the first threshold value input so that the first threshold voltage is equal to the voltage present at the switch output. A capacitor is connected via the switch output to the negative second pole of the first source of direct voltage. The switch output is connected to the first signal input via a diode in such a way that its anode is connected to the switch output. The purpose is to generate a threshold value tracking in order to shorten the close range of the sensor.

U.S. Pat. No. 5,319,611 A discloses an ultrasonic sensor with an adjustable detection range, especially for vehicles, with an ultrasonic transducer for emitting and/or receiving ultrasonic waves in air, whereby the sonic cone of the ultrasonic waves extends axially in the direction of the main axis of the main emitting direction and laterally in the direction perpendicular to said main axis, with a threshold value generator for generating threshold value curves and with a comparator for comparing threshold voltages in order to trigger a switching signal. The ultrasonic sensor can generate two different threshold value curves in the lateral as well as in the axial direction and can distinguish them differently, so that its detection range can be adapted to a certain extent to the application.

German patent application DE 39 37 585 A1 describes a device for range-finding, especially for vehicles, with at least one electro-acoustic transducer for emitting and receiving ultrasonic signals, with a generator for activating the transducer and with a signal receiving stage for the echo signals detected by the transducer, including an amplifier with a downstream comparator that compares the output signal of the amplifier to a certain threshold value that is adjusted to a first value at the beginning of the activation of the transducer. The threshold value for the comparator can be switched over from the first to a second value by means of a switching stage, whereby the first value lies above the highest value that can be measured on the basis of an echo signal, and the second value lies within a range of the values that can be measured on the basis of the echo signals. In a time detection stage, a measuring time span is detected from the beginning of the activation of the transducer to the switching-over of the comparator, when the measuring signal, which is decaying due to the decay of the transducer, falls below the first threshold value, whereby on the basis of this measuring time span, in a computing stage, a later switch-over point in time is computed to which the switching stage switches the threshold value for the comparator over to the second, lower value.

German patent application DE 36 07 335 A1 describes a random creation of the monitoring range of ultrasonic measuring and control apparatuses by means of an adapted control of the sensitivity curve of the ultrasonic receiver, whereby, for purposes of contact-free range-finding according to the ultrasonic-echo transit-time principle, the amplifier performance of the receiver is controlled as a function of the transit time according to a freely defined function. Here, the control curve can be generated digitally with a time-controlled function generator. By the same token, the control curve can be stored in a microcomputer that generates the curve digitally.

Technical Objective

The invention is based on the objective of creating an ultrasonic sensor whose detection range can be adapted to the application on-site via an interface and it should be selectable, whereby the emitted sonic cone should be selectable in its entirety and the angle characteristics should be clearly differentiated at different detection ranges.

In an ultrasonic transducer of the above-mentioned type, the envisaged objective is achieved in that the change in the detection range or the change in the switching point curve of the ultrasonic sensor is made by influencing the threshold value curves that are generated by the threshold value generator, and the detection range can be adjusted either exclusively in the lateral extension of the sonic cone or else in the axial and lateral extensions of the sonic cone, whereby on the one hand, the exclusively lateral influencing of the detection range of the sonic cone is done by a time-dependent threshold generated in each case by the threshold value generator and this time-dependence of the threshold in the case of an exclusively lateral influence is defined in its entirety or in sections by a time-dependent function, said function decreasing either exponentially or linearly or else being a combination of both, or decreasing or increasing in sections or else alternately decreasing and increasing in sections while, on the other hand, the detection range is simultaneously influenced axially and laterally by a time-independent threshold that can be adjusted with respect to the voltage value in each case, whereby the envelope curve generated from the ultrasonic sensor signal in each case is compared to the threshold voltage using the comparator, which then switches when the value of the envelope curve exceeds the threshold voltage.

The term "switching point curve" is defined here as follows: the maximum lateral distance to the ultrasonic sensor axis below which an object can be detected by an ultrasonic sensor depends on the distance between the object and the ultrasonic sensor. Additional influence factors are the orientation, the size and the shape of the object as well as its absorption properties. If, for example, for a target measuring 100 mm×100 mm, one plots the maximum lateral distances as a function of the distance in a Cartesian coordinate system or in a polar coordinate system, one obtains the switching point curve for this object and for the appertaining ultrasonic sensor. It is assumed that the object is always optimally oriented. Therefore, the switching point curve defines the range within which an ultrasonic sensor can still detect a given object.

The ultrasonic sensor according to the invention has the advantage that it can be electronically matched to the application via an interface and thus its sonic cone is selectable in its entirety by means of software, whereby the angle characteristics for different detection ranges differ markedly. A constant threshold value curve yields a constant sensitivity over the entire measuring distance. In an advantageous manner, constant threshold values of different magnitudes yield angle characteristics or switching point curves that differ in their lateral as well as in their axial extensions.

Thus, the exclusively lateral influencing of the detection range of the sonic cone is done by a time-dependent threshold, whereby the influencing of the detection range simultaneously axially and laterally is done by a time-independent threshold that can be adjusted with respect to the voltage value in each case; the envelope curve generated from each ultrasonic sensor signal is compared to the threshold voltage using the comparator, which then switches when the value of the envelope curve exceeds the threshold voltage.

Examples of interfaces are learning inputs, pushbuttons, potentiometers, infrared interfaces, radio interfaces and the like.

Thus, in the case of an exclusively lateral influence, the time-dependence of the threshold is defined in its entirety or in sections by a time-dependent function. The term "in sections" means a mainly monotonously or constantly decreasing time-dependence of the threshold in sections. This time-dependent function can decrease either exponentially or linearly or else can be a combination of both. Moreover, the time-dependent function can decrease or increase in sections or else alternately can decrease and increase in sections; by the same token, the time-dependent function can be a positive or negative step function. Curve branches of the time-dependent function that increase and decrease again in sections serve the purpose of masking out the interference target, for example, in order to mask out a machine part that protrudes into the sonic cone, thereby constituting an interference target.

In another embodiment of the ultrasonic sensor, the threshold voltage of the threshold value generator can be adjusted by means of a DA converter or an electronic potentiometer or selectable resistance arrays or a filtered pulse width modulation source or by means of a capacitor with a source of current in order to form an RC time constant.

In another embodiment according to the invention, the threshold voltage of the threshold value generator can be adjusted by an operator via an interface or an operating element, for example, learning inputs, pushbuttons, serial interfaces, infrared interfaces, radio interfaces and the like. For this purpose, the parameters for influencing the threshold value can be fed via at least one interface to a microcontroller which, on the basis of these parameters, generates control signals that are supplied to the threshold value generator in order to adjust the sonic cone or the detection range.

Another possibility is that an autonomous influencing of the threshold value as a function of environmental conditions such as temperature, air pressure and humidity by control signals that are sent to the threshold value generator and that the microprocessor processes from the measured values supplied by appertaining sensors. The environmental conditions are determined by means of appropriate sensors for the temperature, air pressure, humidity and the like, whose measured values are supplied to the threshold value generator for purposes of appropriately adjusting the threshold voltage.

The parameters for changing the sonic cone in its entirety are thus converted by the microprocessor into control signals and these control signals are supplied to the threshold value generator for appropriately adjusting the threshold voltage so that, via simple changes in the threshold voltage of the threshold value generator, changes can be made to the sonic cone of the ultrasonic sensor, either manually by an operator or automatically, depending on the circumstances on-site.

In another embodiment of the ultrasonic sensor, the low-ohmic transmit-receive signal is available downstream from a voltage follower and it is applied to the threshold value generator as well as to the comparator, whereby a capacitor is charged via a transistor, said capacitor being charged to a higher voltage than the maximum voltage of the transmit-receive signal, whereby a transistor serves for threshold tracking, the transmit-receive signal being applied at the base of said transistor, so that the threshold voltage discharges itself at the capacitor during the decay phase of the ultrasonic transducer via a resistor in the emitter-collector segment of the transistor, after which the threshold voltage and the transmit-receive voltage are compared to each other by means of the comparator. The threshold tracking can be switched off via a transistor and an electronic potentiometer with which the voltage is set at which the threshold tracking is switched off.

BRIEF DESCRIPTION OF THE DRAWING IN WHICH THE FOLLOWING IS SHOWN

Figure 2:
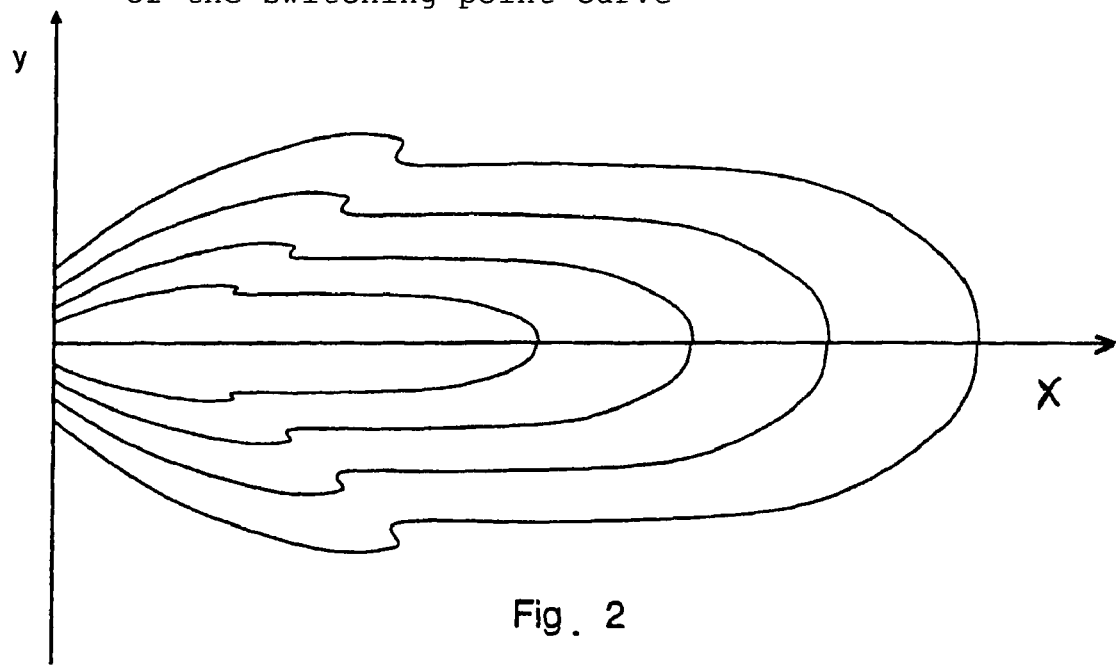
Figure 3:
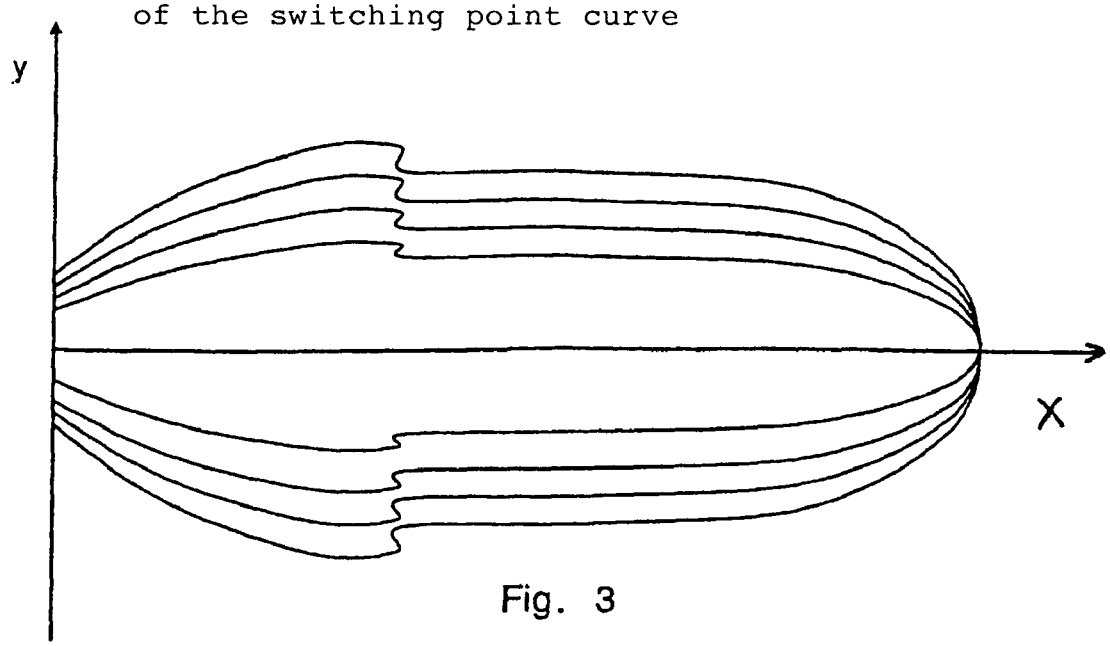
Figure 5:
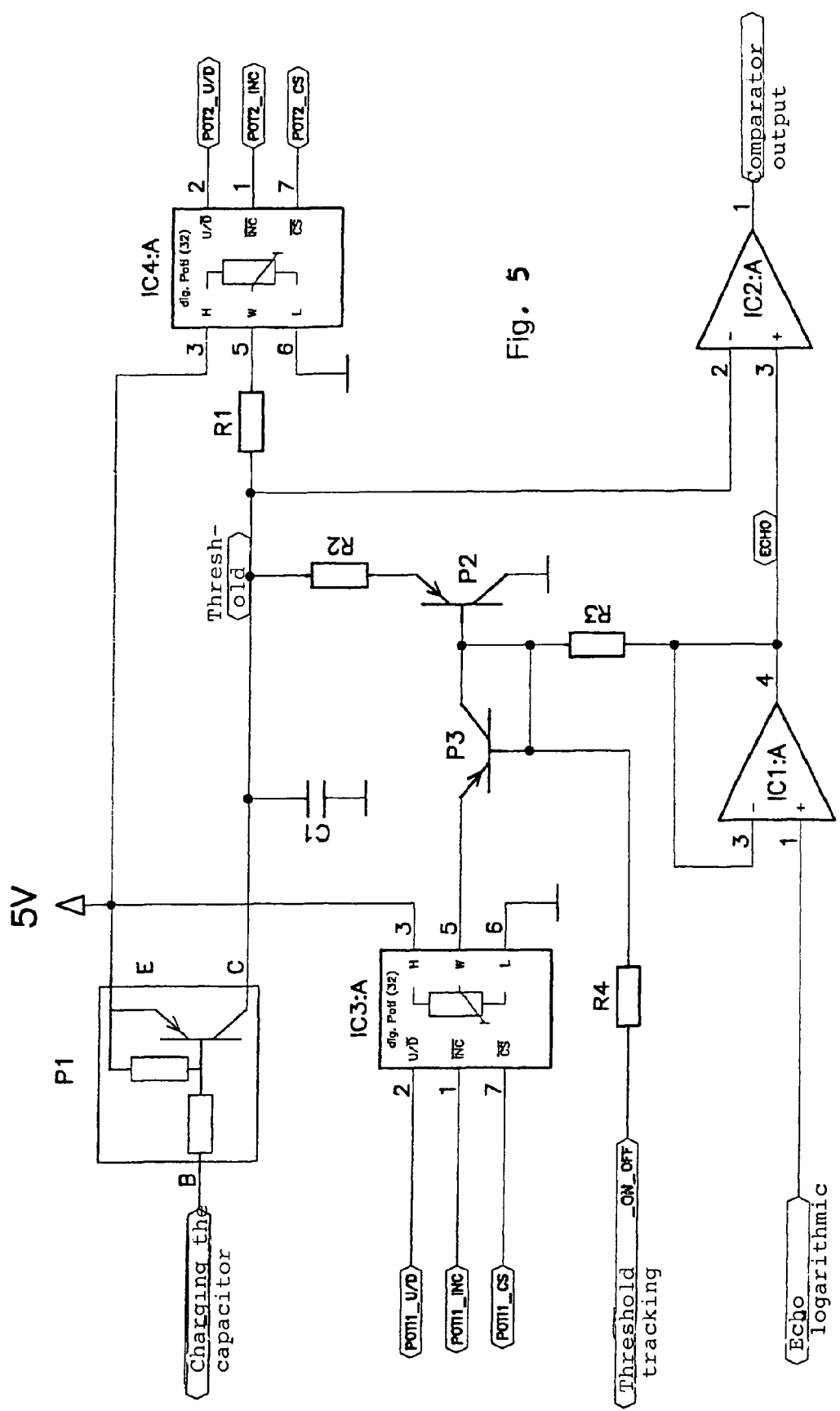

FIG. 1 the signals of the ultrasonic sensor according to the invention, namely, the signal voltage plotted over time, FIG. 2 switching point curves in the case of reduction of the switching point curve, whereby at the same time, an axial and a lateral reduction of the extension of the detection range takes place, FIG. 3 switching point curves in the case of exclusively a narrowing of the switching point curve, FIGS. 4/1+4/2 a block diagram for the implementation of an ultrasonic sensor according to the invention and FIG. 5 a circuit diagram, for example, for the technical implementation of the ultrasonic sensor according to the invention.

FIG. 1 shows the signals of the ultrasonic sensor according to the invention. The lower curve corresponds to the envelope curve of the transmit-receive voltage of the ultrasonic sensor. Since the transmit stage and the receive input are connected to each other, the transmit pulse is visible at the amplifier output. After the transmit pulse, an echo is drawn for illustration purposes. The upper curves or family of curves are the pre-definable threshold value curves. Both signals, the transmit-receive voltage and the threshold value curves, are connected to the inputs of a comparator, FIG. 4. Hence, a signal for the transit time measurement is only triggered if the threshold value curve has been exceeded. The detection range or the switching point curve of the ultrasonic sensor is influenced according to the invention by influencing the threshold value curves.

With the invention, the detection range of the ultrasonic sensor according to the invention can be modified in two different ways. The first way to influence the detection range reduces the axial and the lateral extensions of the detection range as is shown in FIG. 2. This type of influence is referred to below as the reduction of the switching point curve. The second way to influence the detection range reduces exclusively the lateral extension of the detection range as is shown in FIG. 3. This type of influence is referred to below as the narrowing of the switching point curve.

The threshold value curves of both modification possibilities differ only in the area after the transmit pulse or after the transmit pulse has decayed to below a certain value. The threshold value generation in the area of the transmit pulse is extensively described in WO 02/48737-A1, to which reference is made here, comprising a close range shortening through adaptive threshold tracking in ultrasonic sensors.

The transmit pulse is visible at the output of the preferably logarithmic amplifier. The limiter circuit reduces the transmit voltage from a few 100 V to ±0.7 V. This voltage is amplified by the logarithmic amplifier and output at its output. The leading edge of the transmit pulse at the output of the amplifier is relatively steep. The edge steepness is predefined by the trigger pulse of the transducer and by the transient response of the amplifier and of the envelop curve circuit. In contrast, the falling edge is much flatter since the ultrasonic transducer decays exponentially after the excitation. At the output of the logarithmic amplifier, these decays are visible through a virtually linear drop in the voltage. In order to generate the threshold value curve, shortly before the transmit pulse, a capacitor is charged to a voltage that is greater than the amplitude of the transmit pulse. After the capacitor has been charged, it is disconnected from the source of voltage. Towards the end of the excitation phase of the ultrasonic transducer, the capacitor is connected to the signal voltage, for example, via a diode. In this manner, the threshold voltage is reduced in parallel to the signal voltage. However, as long as the signal steadily drops during the decay phase, the threshold voltage always remains 0.7 V above the signal voltage. When the threshold voltage reaches an adjustable voltage, the threshold tracking is deactivated. Starting at this point, the threshold voltage either remains constant—that is the case of reduction of the switching point curve—or else the threshold voltage decreases exponentially—that is the case of narrowing of the switching point curve.

In the case of reduction of the switching point curve, the threshold value curve is constant after this switch-over point. Since the voltage above which the threshold tracking is switched off is adjustable, constant threshold value curves of different magnitudes can be set. A constant threshold value curve yields a constant sensitivity over the entire measuring distance. With different sensitivities, switching point curves are obtained that differ in the lateral as well as in the axial extensions as shown in FIG. 2.

In the case of the narrowing of the switching point curve, the threshold value curve decreases exponentially after the threshold tracking is switched off. This drop is selected in such a way that the reduction of the threshold voltage corresponds as closely as possible to the drop of the echo amplitude on the basis of the transit time-dependent signal attenuation. In this manner, the sensitivity is less at small distances than at large distances. This leads to a narrowing of the switching point curves at smaller distances. At large distances, in contrast, the system is always maximally sensitive. For this reason, the maximum range is always reached at every setting. The result is switching point curves as shown in FIG. 3.

In the mode of operation according to the invention of the ultrasonic sensor as shown in FIG. 4, a microcontroller emits a clock pulse with which an oscillator is activated. The latter generates a burst having the duration of the clock pulse, whereby the curve shape of the clock pulse is rectangular and the frequency of the rectangular wave corresponds to the resonance frequency of the ultrasonic transducer. With this voltage, a transmitter is actuated on its primary side via a driver stage. The transmitter transforms the voltage to values of a few 100 V. This is the excitation voltage of the ultrasonic transducer. Through the excitation, the ultrasonic transducer emits a short ultrasonic pulse that propagates in space as an acoustic wave. The amplitude of the sound wave is subject to a transit time-dependent attenuation.

If the sound wave strikes an object, it is reflected from it and scattered. Part of the reflected wave comes back to the ultrasonic sensor as an echo and, in this case, it is received again by the same ultrasonic transducer. From the transit time of the echo, the ultrasonic sensor can calculate the distance to the object on the basis of the known speed of sound. The received echo voltage is amplified in a preferably frequency-selective, logarithmic amplifier. The amplifier input is protected by means of a limiter circuit against the high voltages during the transmission phase. Subsequently, an envelope curve $U_{signal}$ is formed, which is compared to the described threshold value signal $U_{Ref}$ by a comparator having the two inputs 1a and 1b.

When the threshold value is exceeded, the comparator switches and generates a switching edge $S_S$. The microcontroller measures the time that has elapsed between the excitation of the ultrasonic transducer and the switching edge of the echo signal and, from this, calculates the distance to the object on the basis of the known speed of sound. The ultrasonic sensor is also equipped in a known manner with various interfaces such as switching outputs, analog outputs, synchronization capabilities, learning inputs, serial interfaces, infrared or radio interfaces or inputs for pressure, temperature, humidity and the like.

Thus, on the one hand, the threshold voltage of the threshold value generator can be adjusted by means of an interface or an operating element such as, for example, learning inputs, pushbuttons, serial interface, infrared interface, radio interface and the like. In this process, the parameters are fed via at least one interface to the microcontroller, which generates control signals $S_t$ out of said parameters; these control signals are supplied to the threshold value generator for the adjustment of the sonic cone or of the detection range.

On the other hand, it is likewise possible to effectuate an autonomous control of the threshold value generator as a function of the environmental conditions such as temperature, air pressure and humidity or similar parameters. Here, the measured values representing the environmental conditions are processed, for example, by means of A/D conversion, and fed to the microcontroller, which generates control signals $S_t$ out of said values; these control signals are supplied to the threshold value generator for the adjustment of the sonic cone or of the detection range.

In the example of FIG. 4, the control signals $S_t$ are supplied to a variable potentiometer that feeds its output signal to the threshold value generator. The threshold value generator supplies its output signal $U_{Ref}$ to the input 1a of the comparator; at the same time, the envelope curve signal $U_{signal}$ is applied to the input 1b of the comparator.

The switching point curves can be adjusted, for example, in that the switch-over voltage is controlled by the microcontroller via an electronic potentiometer. The adjustment value can be supplied to the ultrasonic sensor, for example, by means of a serial interface. A limited variety of adjustment possibilities can also be established via a learning input. One possibility is, for instance:

learning input at +UB→maximum switching point curve
learning input at −UB→narrow switching point curve In case of the adjustment via a serial interface, the adjusted shape of the switching point curve can advantageously be displayed on the monitor of a PC during the parametrization procedure.

A circuitry implementation that is possible but only presented by way of an example is described below in FIG. 5. The low-ohmic transmit-receive signal of the ultrasonic transducer is available at Pin 4 of the voltage follower IC1. Via the transistor P1, the capacitor C1 is charged, whereby the voltage is higher than the maximum voltage of the transmit pulse at the output of the logarithmic amplifier, "echo logarithmic" signal. A diode is not used for purposes of threshold tracking, but rather the transistor P2, which is switched as a voltage follower. The transmit-receive signal is present at the base of P2 via the resistor R3, for example, with a value of 100 kOhm. As a result, the threshold voltage of the capacitor C1 is discharged during the decay phase of the ultrasonic transducer via the resistor R2 connected to the capacitor C1. In this process, the discharge voltage is always 0.7 V higher than the transmit-receive voltage. This ensures that the threshold is not exceeded as long as no echo is present.

The threshold voltage and the transmit-receive voltage are compared to each other by means of the comparator IC2. The threshold tracking is switched off by the transistor P3, which can also be replaced by a diode. Using the electronic potentiometer IC3, the voltage is adjusted at which the threshold tracking is switched off. Via the resistor R4, the threshold tracking can be switched off with the microcontroller. For this purpose, the signal "threshold tracking ON-OFF" at the resistor R4 has to be set at 5 V. The discharge voltage of the capacitor C1, when the threshold tracking is switched off, is defined with the potentiometer IC4. The resistor R1 defines the discharging time constant. If the voltage at point 4 of the IC1 is greater than the voltage at point 5 of the IC3, then the threshold changes accordingly. In contrast, if the voltage at point 4 of the IC1 is smaller than the voltage at point 5 of the IC3, then the threshold remains stationary due to the discharging.

In the case of narrowing of the switching point curve, the following signal sequence has to be applied:
- active threshold tracking: "threshold tracking ON-OFF"=0 V
- "charging the capacitor"=0 V
- the potentiometer IC3 is at the desired switch-off voltage of the threshold tracking
- the potentiometer IC4 is at the desired voltage for the threshold voltage at the end of the exponential discharging of C1
- at the end of the excitation pulse: "charging the capacitor"=5 V
- if the signal voltage falls below the potentiometer value IC3 −0.7 V, then the threshold tracking is stopped via P3
- subsequently the capacitor C1 is exponentially discharged via the resistor R1 to a residual voltage that can be defined by the potentiometer IC4.

In case of the reduction of the switching point curve, the following signal sequence has to be applied:
- active threshold tracking: "threshold tracking ON-OFF"=0 V
- "charging the capacitor"=0 V
- the potentiometer IC3 is at the desired switch-off voltage of the threshold tracking
- the potentiometer IC4 is at the desired voltage for the threshold voltage; in this case, this value has to correspond to the value of IC3
- at the end of the excitation pulse: "charging the capacitor"=5 V
- if the signal voltage falls below the potentiometer value IC3 −0.7 V, then the threshold tracking is stopped via P3
- since the potentiometer IC4 has the same value as the potentiometer IC3, the capacitor is not further discharged.

If the variety of the modifications of the switching point curve is to be limited, it is possible to replace the potentiometers with resistance dividers.

The described circuit is only one of the possible embodiments of the invention; other circuit configurations are conceivable.

INDUSTRIAL APPLICABILITY

The subject matter of the invention has industrial applicability especially in range-finding and filling-level measuring technology as well as in automation technology in order to adapt the sonic cone of an ultrasonic sensor to the circumstances on site.

The invention claimed is:

1. A ultrasonic sensor with an adjustable detection range, namely, with an adjustable switching point curve, with an ultrasonic transducer for emitting and/or receiving ultrasonic waves in gaseous media, preferably air, whereby the sonic cone of the ultrasonic waves extends axially in the direction of the main axis of the main emitting direction and laterally in the direction perpendicular to said main axis, with a threshold value generator for generating at least one threshold value curve and with at least one comparator that has a first threshold value input ($1a$) to which the threshold voltage ($U_{ref}$) of the threshold value generator is applied as well as at least one signal input ($1b$) to which the transmit-receive signal ($U_{signal}$) of the ultrasonic transducer is applied, and when a transmit-receive signal ($U_{signal}$) that is greater than the threshold voltage ($U_{ref}$) is present at the comparator, the comparator emits a switching signal ($S_s$), wherein the change in the detection range or the change in the switching point curve of the ultrasonic sensor is made by influencing the threshold value curves that are generated by the threshold value generator, and the detection range can be adjusted either exclusively in the lateral extension of the sonic cone or else in the axial and lateral extensions of the sonic cone, whereby the exclusively lateral influencing of the detection range of the sonic cone is done by a time-dependent threshold generated in each case by the threshold value generator and this time-dependence of the threshold in the case of an exclusively lateral influence is defined in its entirety or in sections by a time-dependent function, said function decreasing either exponentially or linearly or else being a combination of both, or decreasing or increasing in sections or else alternately decreasing and increasing in sections while the detection range is simultaneously influenced axially and laterally by a time-independent threshold that can be adjusted with respect to the voltage value in each case, whereby the envelope curve generated from the ultrasonic sensor signal in each case is compared to the threshold voltage using the comparator, which then switches when the value of the envelope curve exceeds the threshold voltage.

2. The ultrasonic sensor according to claim 1, wherein the threshold voltage of the threshold value generator can be adjusted by means of a DA converter or an electronic potentiometer or selectable resistance arrays or a filtered pulse width modulation source or by means of a capacitor with a source of current in order to form an RC time constant.

3. The ultrasonic sensor according to claim 1, wherein the threshold voltage of the threshold value generator can be adjusted by supplying parameters via an interface or an operating element.

4. The ultrasonic sensor according to claim 1, wherein the threshold voltage of the threshold value generator can be autonomously adjusted as a function of environmental conditions.

5. The ultrasonic sensor according to claim 4, wherein the environmental conditions are determined by means of sensors whose measured values are supplied to the threshold value generator.

6. The ultrasonic sensor according to claim 5, wherein the parameters are fed via at least one interface to a microcontroller which, on the basis of these parameters, generates control signals ($S_t$) that are supplied to the threshold value generator in order to adjust the sonic cone or the detection range.

7. The ultrasonic sensor according to claim 1, wherein the interface software of the microcontroller for supplying the parameters comprises a visualization of the detection range.

8. The ultrasonic sensor according to claim 1, wherein the low-ohmic transmit-receive signal ($U_{signal}$) is available downstream from a voltage follower (IC1) and it is applied to the threshold value generator as well as to the comparator, in that a capacitor (C1) is charged via a transistor (P1), said capacitor (C1) being charged to a higher voltage than the maximum voltage of the transmit-receive signal, whereby a transistor (P2) serves for threshold tracking, the transmit-receive signal being applied at the base of said transistor, so that the threshold voltage discharges itself at the capacitor (C1) during the decay phase of the ultrasonic transducer via a resistor in the emitter-collector segment of the transistor (P2), after which the threshold voltage and the transmit-receive voltage are compared to each other by means of the comparator (IC2).

9. The ultrasonic sensor according to claim 8, wherein the threshold tracking can be switched off via a transistor (P3) and an electronic potentiometer (IC3) or selectable resistance array with which the voltage is set at which the threshold tracking is switched off.

10. The ultrasonic sensor according to claim 1, wherein, in a selectable manner, the detection range can be adjusted either exclusively in the lateral extension of the sonic cone or else in the axial and lateral extensions of the sonic cone.

11. The ultrasonic sensor according to claim 1, wherein the time-dependent function is a step function.

* * * * *